US010419365B2

(12) United States Patent
Jiang et al.

(10) Patent No.: US 10,419,365 B2
(45) Date of Patent: Sep. 17, 2019

(54) SERVICE INSERTION IN BASIC VIRTUAL NETWORK ENVIRONMENT

(71) Applicant: Hillstone Networks Corp., Sunnyvale, CA (US)

(72) Inventors: Dongyi Jiang, San Jose, CA (US); Jin Shang, Saratoga, CA (US); Ye Zhang, Sunnyvale, CA (US); Juxi Li, San Jose, CA (US); Hua Ji, Cupertino, CA (US)

(73) Assignee: Hillstone Networks Corp., Sunnyvale, CA (US)

( * ) Notice: Subject to any disclaimer, the term of this patent is extended or adjusted under 35 U.S.C. 154(b) by 607 days.

(21) Appl. No.: 14/691,470

(22) Filed: Apr. 20, 2015

(65) Prior Publication Data

US 2016/0308790 A1     Oct. 20, 2016

(51) Int. Cl.
*H04L 12/931* (2013.01)
*H04L 12/46* (2006.01)

(52) U.S. Cl.
CPC .......... *H04L 49/70* (2013.01); *H04L 12/4641* (2013.01)

(58) Field of Classification Search
CPC .......................... H04L 49/70; H04L 12/4641
See application file for complete search history.

(56) References Cited

U.S. PATENT DOCUMENTS

| | | | | |
|---|---|---|---|---|
| 8,601,473 B1* | 12/2013 | Aron | .................. | G06F 9/45533 709/223 |
| 9,178,828 B2* | 11/2015 | Kumar | ................ | H04L 47/2425 |
| 9,178,912 B2* | 11/2015 | Sharma | .................. | H04L 49/70 |
| 9,313,048 B2* | 4/2016 | Chang | ................. | H04L 12/6418 |
| 9,548,896 B2* | 1/2017 | Naiksatam | ......... | H04L 41/0893 |
| 9,787,559 B1* | 10/2017 | Schroeder | ............. | H04L 43/067 |
| 9,794,193 B2* | 10/2017 | Rao | ......................... | H04L 49/10 |

(Continued)

FOREIGN PATENT DOCUMENTS

| | | |
|---|---|---|
| CN | 102137007 A | 7/2011 |
| CN | 104272684 A | 1/2015 |

OTHER PUBLICATIONS

Foreign Office Action dated Sep. 4, 2018 for Chinese Patent App. No. 201610220488.8.

*Primary Examiner* — Rasheed Gidado
(74) *Attorney, Agent, or Firm* — Vista IP Law Group, LLP

(57) ABSTRACT

A processing system includes: a first service machine having a first service module; and a first service switch; wherein the first service machine and the first service switch are configured for logically coupling between virtual machines and a virtual switch; wherein the first service machine comprises a first communication interface and a second communication interface, the second communication interface configured for communication with the first service switch. A processing system includes: a service module; a first communication interface for communication with a virtual switch, the virtual switch configured for communicating with virtual machines; a second communication interface for communication with the virtual switch; the first communication interface being associated with a plurality of VM-based network segments at the virtual switch, the plurality of VM-based network segments corresponding with the plurality of virtual machines, respectively; and wherein the second communication interface is associated with original network segments at the virtual switch.

35 Claims, 7 Drawing Sheets

(56) References Cited

U.S. PATENT DOCUMENTS

| | | | |
|---|---|---|---|
| 10,205,657 B2* | 2/2019 | Chang | H04L 12/4633 |
| 2013/0124597 A1* | 5/2013 | Diao | H04L 67/02 |
| | | | 709/201 |
| 2013/0125112 A1* | 5/2013 | Mittal | G06F 9/45558 |
| | | | 718/1 |
| 2013/0263118 A1* | 10/2013 | Kannan | G06F 9/45558 |
| | | | 718/1 |
| 2014/0201375 A1* | 7/2014 | Beereddy | H04L 47/70 |
| | | | 709/226 |
| 2014/0321459 A1 | 10/2014 | Kumar et al. | |
| 2015/0026345 A1* | 1/2015 | Ravinoothala | H04L 45/245 |
| | | | 709/226 |
| 2015/0277951 A1* | 10/2015 | Sundararaman | G06F 9/45558 |
| | | | 718/1 |
| 2015/0295758 A1* | 10/2015 | Melander | H04W 76/022 |
| | | | 370/254 |
| 2015/0363221 A1* | 12/2015 | Terayama | H04L 12/4641 |
| | | | 718/1 |

* cited by examiner

SERVICE INSERTION IN BASIC VIRTUAL NETWORK ENVIRONMENT

FIELD

This application relates generally to service insertion in virtualized computing environment, like enterprise virtualized server farms, private data center, public cloud, or hybrid cloud, etc.

BACKGROUND

In Network Function Virtualization (NFV), network services are virtualized. In some cases, it may be possible to deploy network services next to Virtual Machines (VMs), and provide services on the communication between any two VMs in data center, or between any VM and the Internet. In virtualized computing environment, certain Software-defined Networking (SND) technology may be employed to implement service insertion.

Small scale date centers usually do not require a SDN solution to manage its network. However, implementation of virtualized services may still require a SDN solution.

SUMMARY

One or more embodiments described herein provide a technique to insert virtualized services into a basic virtualized computing environment without any SDN support.

A processing system includes: a first service machine having a first service module; and a first service switch; wherein the first service machine and the first service switch are configured for logically coupling between a plurality of virtual machines and a virtual switch; wherein the first service machine comprises a first communication interface and a second communication interface, the second communication interface configured for communication with the first service switch.

Optionally, the first communication interface is configured for communication with the virtual switch.

Optionally, the first service switch comprises a third communication interface configured for communication with the plurality of virtual machines. The third communication interface may include sub-interfaces for communication with the respective virtual machines.

Optionally, the first service switch is configured to provide VM-based network segments.

Optionally, the VM-based network segments correspond with the plurality of virtual machines, respectively.

Optionally, the virtual switch is also configured to provide original network segments, and wherein the first service machine comprises a mapping for mapping the original network segments and the VM-based network segments.

Optionally, at least one of the VM-based network segments is based on a VLAN, a bridge, a VMware port group.

Optionally, one of the virtual machines is configured to communicate with another one of the virtual machines through the first service machine.

Optionally, the first service module comprises a firewall, an IPS, a WAF, a QoS, or a DPI.

Optionally, the first service module is configured to provide a virtualized function.

Optionally, the processing system further includes the virtual switch.

Optionally, the virtual switch comprises a Linux bridge, an open vSwitch, a VMware vSphere standard switch, or a VMware vSphere distributed switch.

Optionally, the first communication interface is configured for communication with the virtual switch through a first trunk, and the second communication interface is configured for communication with the first service switch through a second trunk.

Optionally, the processing system further includes: a second service machine having a second service module; and a second service switch; wherein the second service machine and the second service switch are configured for logically coupling between the plurality of virtual machines and the virtual switch.

Optionally, the first service machine, the first service switch, the second service machine, and the second service switch are coupled serially in a logical sense.

Optionally, the service machine is configured to map packets into different network segments based on packet destinations.

A data center includes the processing system, an additional processing system, and a physical switch, wherein the processing system and the additional processing system are coupled to the physical switch, and wherein the additional processing system comprises: a second service machine having a second service module; and a second service switch; wherein the second service machine and the second service switch are configured for logically coupling between an additional plurality of virtual machines and an additional virtual switch.

A method of implementing a processing system includes: providing a first service machine having a first service module; providing a first service switch; and logically coupling the first service machine and the first service switch between a plurality of virtual machines and a virtual switch; wherein the first service machine comprises a first communication interface and a second communication interface, the second communication interface configured for communication with the service switch.

Optionally, the first communication interface is configured for communication with the virtual switch.

Optionally, the first service switch comprises a third communication interface configured for communication with the plurality of virtual machines Optionally, the method further includes providing VM-based network segments at the first service switch.

Optionally, the VM-based network segments correspond with the plurality of virtual machines, respectively.

Optionally, the virtual switch is configured to provide original network segments, and wherein the method further comprises providing a mapping at the first service machine for mapping the original network segments and the VM-based network segments.

Optionally, at least one of the VM-based network segments is based on a VLAN, a bridge, a VMware port group.

Optionally, the first service module comprises a firewall, an IPS, a WAF, a QoS, or a DPI.

Optionally, the first service module is configured to provide a virtualized function.

Optionally, the virtual switch comprises a Linux bridge, an open vSwitch, a VMware vSphere standard switch, or a VMware vSphere distributed switch.

Optionally, the act of logically coupling the first service machine and the first service switch between the plurality of virtual machines and the virtual switch comprises communicatively coupling the first service machine with the virtual switch through a first trunk, and communicatively coupling the first service machine with the first service switch through a second trunk.

Optionally, the method further includes: providing a second service machine having a second service module; providing a second service switch; and logically coupling the second service machine and the second service switch between the plurality of virtual machines and the virtual switch.

Optionally, the first service machine, the first service switch, the second service machine, and the second service switch are coupled serially in a logical sense.

Optionally, the method further includes configuring the service machine to map packets into different network segments based on packet destinations.

A processing system includes: a service module; a first communication interface for communication with a virtual switch, the virtual switch configured for communicating with a plurality of virtual machines; a second communication interface for communication with the virtual switch; wherein the service module, the first communication interface, and the second communication interface are parts of a service machine; wherein the first communication interface is associated with a plurality of VM-based network segments at the virtual switch, the plurality of VM-based network segments corresponding with the plurality of virtual machines, respectively; and wherein the second communication interface is associated with original network segments at the virtual switch.

Optionally, the service machine comprises a mapping for mapping the original network segments and the VM-based network segments.

Optionally, at least one of the VM-based network segments is based on a VLAN, a bridge, a VMware port group.

Optionally, the service module comprises a firewall, an IPS, a WAF, a QoS, or a DPI.

Optionally, the service module is configured to provide a virtualized function.

Optionally, the processing system further includes the virtual switch.

Optionally, the virtual switch comprises a Linux bridge, an open vSwitch, a VMware vSphere standard switch, or a VMware vSphere distributed switch.

Optionally, the first communication interface is configured for communication with the virtual switch through a first trunk, and the second communication interface is configured for communication with the virtual switch through a second trunk.

Optionally, the service machine is configured to map packets into different network segments based on packet destinations.

A data center includes the processing system, an additional processing system, and a physical switch, wherein the processing system and the additional processing system are coupled to the physical switch, and wherein the additional processing system comprises: an additional service module; a third communication interface for communication with an additional virtual switch, the additional virtual switch configured for communicating with an additional plurality of virtual machines; and a fourth communication interface for communication with the additional virtual switch; wherein the additional service module, the third communication interface, and the fourth communication interface are parts of an additional service machine.

A method of implementing a processing system includes: providing a service machine having a service module, a first communication interface, and a second communication interface, wherein the first communication interface is configured for communication with a virtual switch, and wherein the second communication interface is configured for communication with the virtual switch, the virtual switch configured for communicating with a plurality of virtual machines; and logically coupling the service machine to the virtual switch by: associating the first communication interface with a plurality of VM-based network segments at the virtual switch, the plurality of VM-based network segments corresponding with the plurality of virtual machines, respectively; and associating the second communication interface with original network segments at the virtual switch.

Optionally, the method further includes providing the VM-based network segments at the virtual switch.

Optionally, the method further comprises providing a mapping at the service machine for mapping the original network segments and the VM-based network segments.

Optionally, at least one of the VM-based network segments is based on a VLAN, a bridge, a VMware port group.

Optionally, the service module comprises a firewall, an IPS, a WAF, a QoS, or a DPI.

Optionally, the service module is configured to provide a virtualized function.

Optionally, the virtual switch comprises a Linux bridge, an open vSwitch, a VMware vSphere standard switch, or a VMware vSphere distributed switch.

Optionally, the act of logically coupling the service machine and the virtual switch comprises communicatively coupling the service machine with the virtual switch through a first trunk, and communicatively coupling the service machine with the virtual switch through a second trunk.

Optionally, the method further includes configuring the service machine to map packets into different network segments based on packet destinations.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
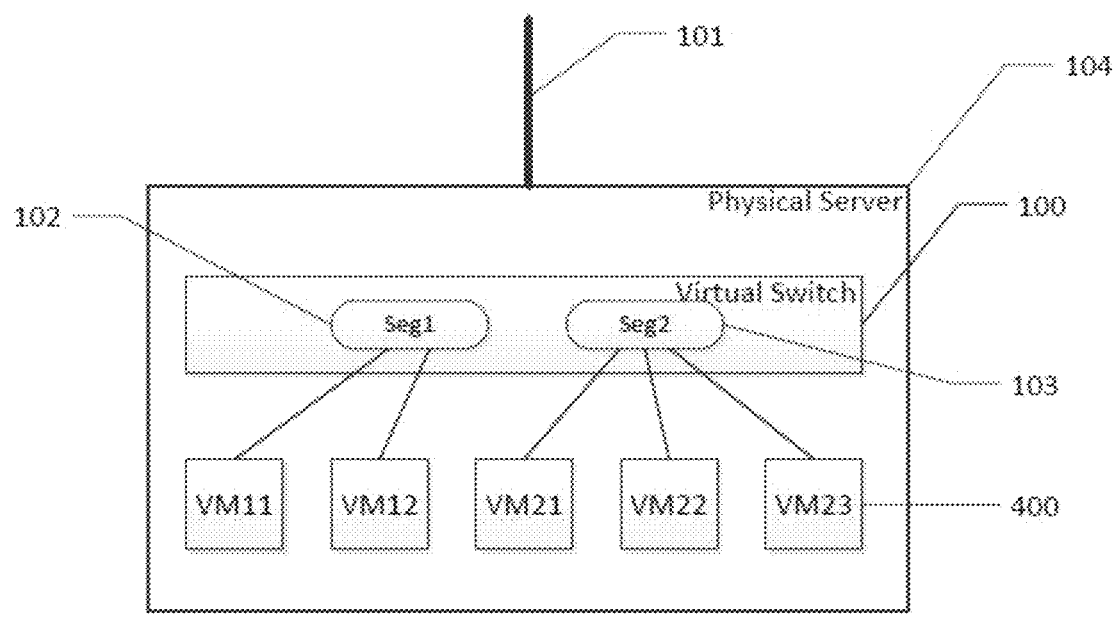
FIG. 1 illustrates a virtual machine (VM) deployment scenario without service insertion.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

In a virtualized processing system, each physical server hosts one or more virtual switches and multiple user virtual machines (VMs) that connect to the virtual switches. Multiple broadcast domains (network segments) may be configured on a virtual switch. The user VMs on the same network segment may communicate to one another through the virtual switch. Virtualized network function/service may run on service VMs (service machines). These service machines may connect on the same virtual switch as other user VMs. However, without SDN support on the virtual switch, the communication between two user VMs on the same network segment will not goes through the service machine.

To illustrate the above point, refer to FIG. 1, which illustrates a virtual machine (VM) deployment scenario without service insertion. In particular, it shows a user VM setup in a virtualized data center. The data center may contain multiple physical servers, one of which (i.e., physical server 104) is shown in the figure. As shown in the figure, the physical server 104 connects to the data center network through a physical connection 101. On the server 104, a virtual switch 100 is configured. The virtual switch 100 may be a single virtual switch, or may contain multiple sub-switches. Also, in the physical server 104, user VMs 400 connect to the virtual switch 100. In the illustrated example, user VMs 400 belongs to different user networks. In particular, user VM11 and user VM 12 belong to a first user network, and user VM21, user VM22, and user VM23 belong to a second user network. Accordingly, two corresponding network segments, Seg1 102 and Seg2 103, are configured on the virtual switch 100 for the first and second user networks, respectively. As a result, VM11, VM12 connect to the network segment Seg1 103, and VM21, VM22, VM23 connect to the network segment Seg2.

In the setup shown in FIG. 1, traffic between the VMs on one network segment is switched on the virtual switch 100 by design. If a new service VM is connected on the same virtual switch 100, the above VM traffic will not go through the new service VM. To insert service between VMs connecting on the same network segment, the virtual switch 100 has to be configured to support advance configuration, like flow rule configuration. Also, additional controller module, like SDN controller, has to be deployed to control the virtual switch 100. A basic virtualized data center may not have the advanced virtual switch and the SDN solution required for implementing the insertion of such service.

Figure 2A:
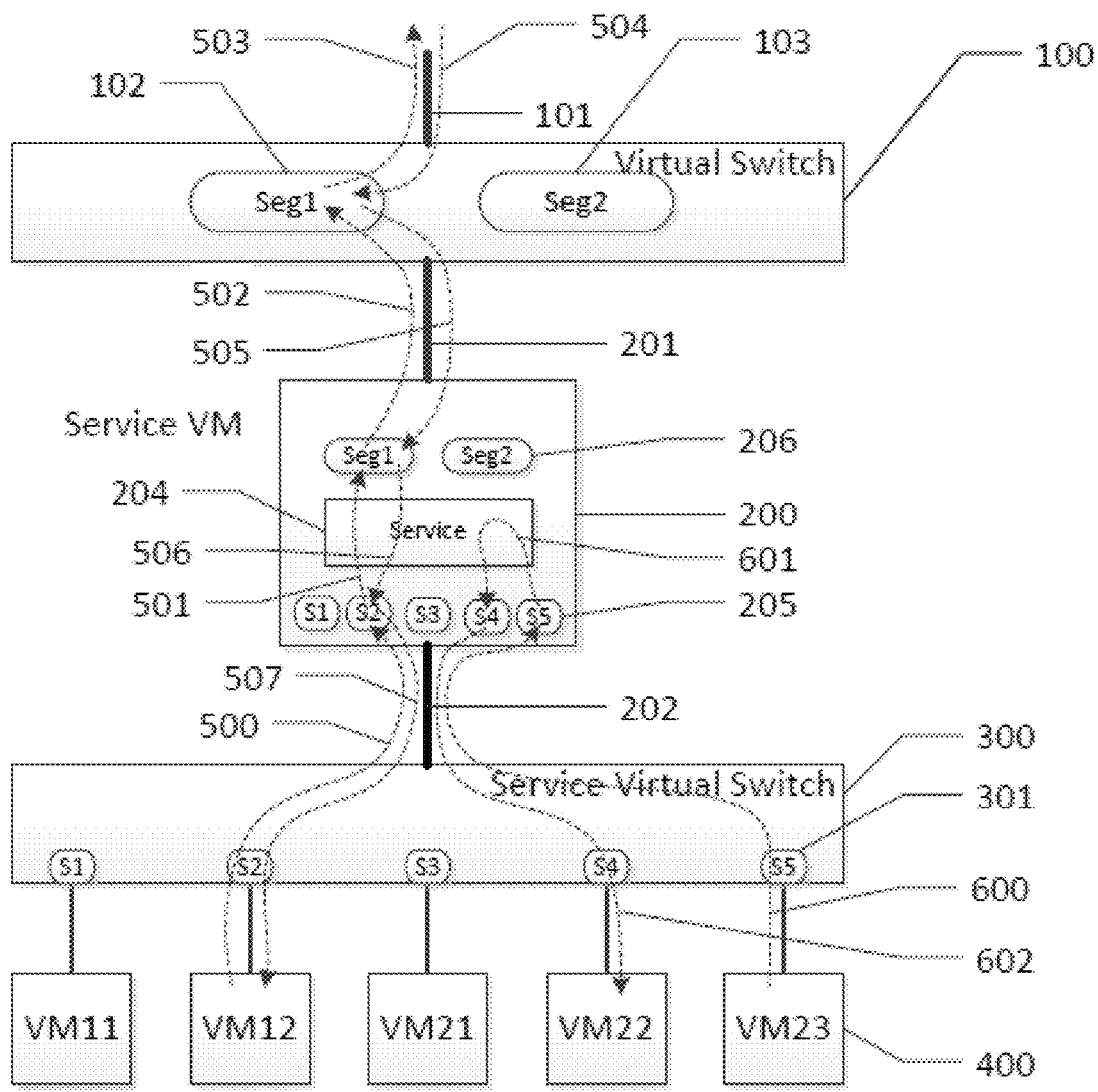
FIG. 2A illustrates a processing system in accordance with some embodiments.

FIG. 2A illustrates a processing system in accordance with some embodiments, particularly showing a service insertion technique. As shown in the figure, the virtual switch 100 is configured on a physical server. The virtual switch 100 connects to the rest of data center network through the physical connection (an uplink) 101. By means of non-limiting examples, the virtual switch 100 may comprise a Linux bridge, an open vSwitch, a VMware vSphere standard switch, or a VMware vSphere distributed switch.

Two network segments, Seg1 102 and Seg2 103, are configured on the virtual switch 100. Accordingly, the virtual switch 100 has the same or similar set up as that shown in FIG. 1. It should be noted that as used in this specification, the term "segment" or "network segment" refers to any division of a network. For example, a network segment may be a broadcast domain (or a part of a broadcast domain) that is a logical division of a computer or communication network. A broadcast domain may be within a same segment or it may be bridged to other segment(s). A segment may be created using VLAN, bridge, port group, or any of other techniques.

As shown in FIG. 2A, the processing system includes a service VM (service machine) 200 that connects to the virtual switch 100 through a trunk 201. The processing system also includes a service virtual switch (service switch) 300 that connects to the service machine 200 through another trunk 202. Multiple VMs 400 (VM11, VM12, VM21, VM22, VM23 in the example) connect to the service virtual switch 300. In the illustrated embodiments, the service machine 200 includes a first communication interface for communication with the service switch 300 through the trunk 202, and a second communication interface for communication with the virtual switch 100 through the trunk 201. In some cases, the first and second communication interfaces may be respective trunk ports.

As discussed before with reference to FIG. 1, user VM11 and VM12 were originally connected to Seg1 102 on virtual switch 100. Accordingly, in the deployment shown in FIG. 2A, two VM based network segments, S1 and S2 301, are configured on the service switch 300 for these user VMs. VM11 and VM12 connect to these segments respectively. Also, as discussed before with reference to FIG. 1, VM21, VM22 and VM23 were connected to Seg2 103 on the virtual switch 100. Accordingly, in the deployment shown in FIG. 2A, three VM based network segments, S3, S4 and S5 301, are configured on the service switch 300 for these VMs. VM21, VM22 and VM23 connect to these segments respectively.

On the service machine 200, two network segments, Seg1 and Seg2 206, are configured on the communication interface on which trunk 201 connects. This ensures that Seg1 and Seg2 206 have the same network connectivity as the Seg1 102 and Seg2 103 on the virtual switch 100. Also, on the service machine 200, five network segments, S1, S2, S3, S4, and S5 205, are configured on the communication interface on which trunk 202 connects. The network segments 205 correspond (e.g., match) the configuration of the network segments 301 on the service switch 300. This ensures that each VM 400 can reach the network segment 205 on the service machine 200. In some cases, the service machine 200 may be configured to map packets into different network segments based on packet destinations. In other cases, the mapping may be based on other parameter(s).

Since the user VM11 and the user VM12 used to connect to Seg1 102 on the virtual switch 100, segments S1 and S2 at the service switch (which corresponds with the VM11 and VM12) are related to Seg1 on the service machine 200. Similarly segments S3, S4 and S5 are related to Seg2 on the service machine 200. The service machine 200 is configured to provide this mapping relationship that maps the VM-based network segments with the original network segments. Based on this mapping, packet is labeled with the corresponding tag when it is sent to certain segment. For example, packets may be tagged by the service switch 300, the virtual switch 100, or both. In some cases, the service machine 200 may also be configured to tag packets and/or modify tags of packets. By means of non-limiting examples, the VM-based network segments may be based on a VLAN, a bridge, a VMware port group.

As shown in FIG. 2A, the service machine 200 includes a service module 204. The service module 204 is configured to provide one or more network service(s). By means of non-limiting examples, the service module 204 may be configured to provide one or more firewall function(s), one or more intrusion prevention function(s), one or more WAF function(s), one or more QoS function(s), one or more DPI function(s), etc., or any combination of the foregoing. Also, any or all of the above functions may be virtualized functions. Thus, the service module 204 may comprise a firewall, an IPS, a WAF, a QoS, a DPI, or any combination of the foregoing. Also, in some cases, the service module 204 may include a mapping module configured to provide the mapping between the VM-based network segments and the original network segments that are associated with the virtual switch 100. In other cases, the service machine 200 may include another module for providing such segment mapping function. In other embodiments, the service machine 200 may include multiple service modules 204.

Two packet flow examples will now be described to illustrate how the processing system of FIG. 2A can provide inserted services. In the first example, the user VM12 sends packet to and receive packet from the Internet. When the user VM12 sends packet to the Internet, it first sends the packet to the default gateway of its network, then the default gateway sends the packet to other nodes on Internet. In this example, the default gateway can be reached through trunk connection 101. Also, in this example, it is assumed that all ports on virtual switches and the VM12 have learned the MAC address of the interface on the default gateway. The packet leaves the user VM12 and enters segment S2 on the service switch 300. Based on MAC lookup, the service switch 300 forwards the packet through the trunk connection 202, and the packet reaches segment S2 on the service machine 200. This packet path is represented by arrow 500. Inside the service machine 200, one or more service(s) is provided by the service module 204 for the packet, and the packet is then forwarded to segment Seg1 as represented by arrow 501. The service machine 200 then transmits the packet through trunk 201, and the packet then reaches segment Seg1 102 at the original virtual switch 100. This path is represented by arrow 502. The packet is then sent to the default gateway through trunk 101, as represented by arrow 503.

A server on the Internet returns a packet, and the return packet first reaches the default gateway. The return packet then reaches segment Seg1 102 at the original virtual switch 100 through trunk connection 101, as represented by arrow 504. The packet is forwarded to Seg1 on the service machine 200 as represented by arrow 505. The return packet goes through the service module 204 as represented by arrow 506, where one or more service(s) is provided for the return packet. The return packet is then transmitted on segment S2 and reaches the user VM12, as represented by arrow 507.

As shown in the above examples, through the service switch 300 and the service machine 200, the desired service(s) is inserted to the packet path between the user VM12 and the Internet.

The processing system of FIG. 2A can also provide the desired service(s) in the communication path between two user VMs on the same network segment, such as in the communication path between the user VM22 and the user VM23. In the original deployment described with reference to FIG. 1, the user VM22 and the user VM23 were connected to segment Seg2 103 on the virtual switch 100. Accordingly, service cannot be inserted in a communication path between the user VM22 and the user VM23 in this kind of deployment.

In the configuration shown in FIG. 2A, the user VM22 and the user VM23 connect to separate segments on the service switch 300. Since the user VM23 and the user VM22 connect to two different respective network segments, S4 and S5, they do not directly communicate with each other on the service switch 300. Instead, the user VM23 sends packet to segment S5 on the service switch 300, and the packet is then forwarded to segment S5 on the service machine 200, as represented by packet path 600. Based on a service rule configuration in the service module 204, the service module 204 forwards the packet to Seg4, as represented by arrow 601. Then the packet is sent to the user VM22 in segment S4 at the service switch 300, as represented by arrow 602. Through the configuration of the service switch 300 and the VM-based network segment, the communication between two user VMs can go through the service machine 200, which provides the desired service(s) for packets being communicated between the two user VMs.

In some embodiments, the processing system of FIG. 2A may be achieved through a method that includes (1) providing the service machine 200 having the service module 204, (2) providing the service switch 300, and (3) logically coupling the service machine 200 and the service switch 300 between existing user VMs 400 and an existing virtual switch 100. The act of logically coupling may include moving user VMs 400 from the original virtual switch 100 to the service switch 300. Also, the act of logically coupling may include communicatively coupling the service machine 200 with the virtual switch 100 through a first trunk, and communicatively coupling the service machine 200 with the service switch 300 through a second trunk.

The method may also include creating VM-based network segments on the service switch 300, which correspond with the plurality of user VMs 400. The method may also include providing a mapping (e.g., a mapping module) at the service machine 200 for mapping original network segments associated with the virtual switch 100, with the VM-based network segments. The VM-based network segments may be based on VLAN(s), bridge(s), VMware port group(s), etc. The method may also include configuring the service machine 200 to map packets into different network segments based on packet destinations. In some embodiments, a packet mapping configurator may be provided to configure the service machine 200 so that it can map packets into different network segments based on the packet destinations.

Figure 2B:
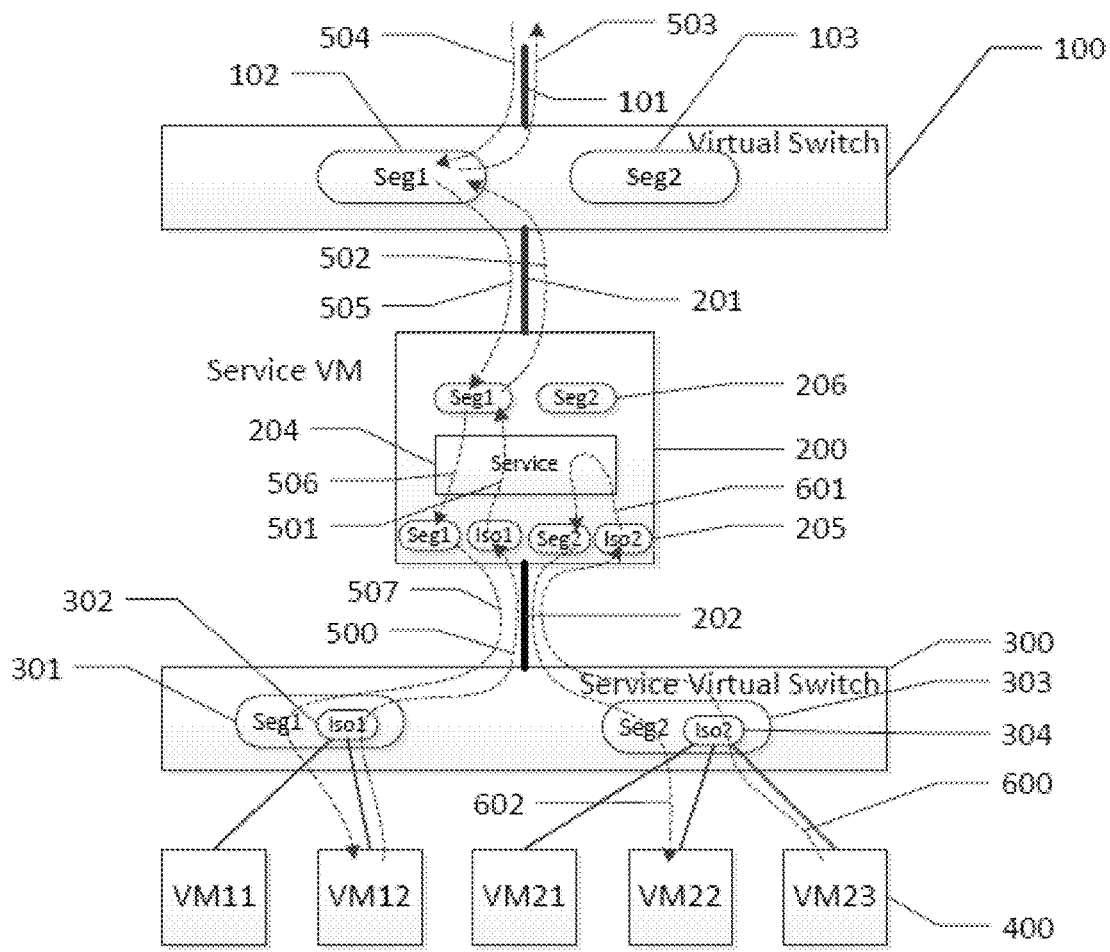
FIG. 2B illustrates a variation of the processing system of FIG. 2A.

As shown in FIG. 2A, VM-based network segments are configured on both the service VM 200 and the service switch 300. These segments provide isolation among the VMs 400. In some cases, a virtual switch such as VMware vSphere Distributed Switch (VDS), etc., may provide an easy way to implement this type of isolation through its Private VLAN support. FIG. 2B shows how the system of FIG. 2A may be implemented with VDS Private VLAN support, particularly showing how private VLAN may be used to create isolation for VMs.

Private VLAN may be available on some hardware switches and virtual switches. In some cases, a private VLAN configuration may contain the definition of several VLAN/segments. For example, a private VLAN implementation (such as that on VMware vSphere Distributed Switch (VDS)) may include:

Primary PVLAN: VMs in this segment can communicate to outside world, and VMs in the Secondary PVLANs.

Isolated Secondary PVLAN: VMs in this VLAN are isolated to each other. They only can communicate to Primary PVLAN.

Shared Secondary PVLAN: VMs in this VLAN can communicate to Primary PVLAN and VMs in the same Secondary PVLAN.

In some cases, only the primary PVLAN and the isolated Secondary PVLAN are configured to achieve the desired service(s).

Assume originally user VMs connect to Seg1 102 and Seg2 103 on the virtual switch 100, like that shown in FIG. 1. Accordingly, as shown in FIG. 2B, a service virtual switch 300 is created to provide isolation. On the service switch 300, two private VLANs are created. The first private VLAN contains primary PVLAN Seg1 301, and an isolated secondary PVLAN Iso1 302. All the VMs 400 that used to connect to Seg 1 102 are now all connected to the Iso1 302. The second private VLAN contains Primary PVLAN Seg2 303 and an isolated secondary PVLAN Iso2 304. All the VMs 400 that used to connect to Seg2 103 are now all connected to the Iso2 304. The private VLAN support greatly reduces the number of network segments on the service switch 300. In this setup, the user VMs connected to an isolated secondary PVLAN may not directly communicate to each other. Instead, packets from the user VMs may go through the Primary VLAN to allow the user VMs to communicate with each other.

To match the segment configuration on the service switch 300, four network segments, Seg1, Iso1, Seg2, and Iso2 205, are created on the trunk interface (connecting to trunk 202) on the service VM 200. Only two segments, Seg1 and Seg2 206, are created on the trunk interface (connecting to trunk 201) at the service VM 200.

Two packet flow examples will now be described to illustrate how services can be inserted with this deployment. In the first example, the user VM12 sends a packet to and receives a packet from the Internet. When the user VM12 sends the packet to the Internet, it first sends the packet to the default gateway of its network, then the default gateway sends the packet to other nodes on the Internet. In this deployment example, the default gateway can be reached through the trunk 101. It is assumed that all the ports on virtual switches and the VM12 have learned the MAC address of the interface on the default gateway. The packet leaves the VM12 and enters segment Iso1 302 on the service switch 300. Based on MAC lookup, the service switch 300 forwards the packet through the trunk 202, and the packet reaches segment Iso1 on the service VM 200. The packet path is represented by arrow 500. Inside the service VM 200, one or more desired service(s) is applied on the packet, and the packet is then forwarded to segment Seg1 206. The service VM 200 then transmits the packet through the trunk 201, and the packet reaches segment Seg1 102. This path is represented by arrow 502. At last the packet is sent to the default gateway through the trunk 101, as represented by arrow 503.

A node on the Internet sends a return packet. The return packet from the Internet first reaches the default gateway. Then it reaches segment Seg1 102 through the trunk connection 101, as represented by arrow 504. The packet is then forwarded to Seg1 on the service VM 200, as represented by arrow 505. The packet goes through the service module 204, wherein one or more desired service(s) is performed, as represented by arrow 506. The packet is then transmitted on segment S2 205, on the service VM 200, and the packet reaches the VM12, as represented by arrow 507. Accordingly, through the service switch 300 and the service VM 200, the required service(s) is inserted to the packet path between the user VM12 and the Internet.

The illustrated system can also insert service(s) into the communication path between two user VMs on the same network segment, such as the communication path between the user VM22 and the user VM23. In the original deployment shown in FIG. 1, user VM22 and user VM23 are connected to segment Seg2 103 on the virtual switch 100. Thus, service cannot be inserted between the user VM22 and the user VM23 in the original deployment. In the system shown in FIG. 2B, the user VM22 and the user VM23 are connected to the isolated secondary PVLAN 304 on the service switch 300.

Since the user VM23 and the user VM22 are on isolated secondary PVLAN 304, they cannot directly communicate on the service switch 300. Instead, the user VM23 sends the packet to Iso2 304, and the packet is then forwarded to segment Iso2 on the service VM 200, as represented by arrow 600. Based on the service rule configuration, the service module 204 forwards the packet to Seg2 on the service VM 200. Then the packet is sent to the user VM22 through the segment Seg2 303. Through the configuration of the private VLAN on the service switch 300, the communication between two user VMs can go through the service VM 200, which provides the desired service.

Figure 3:
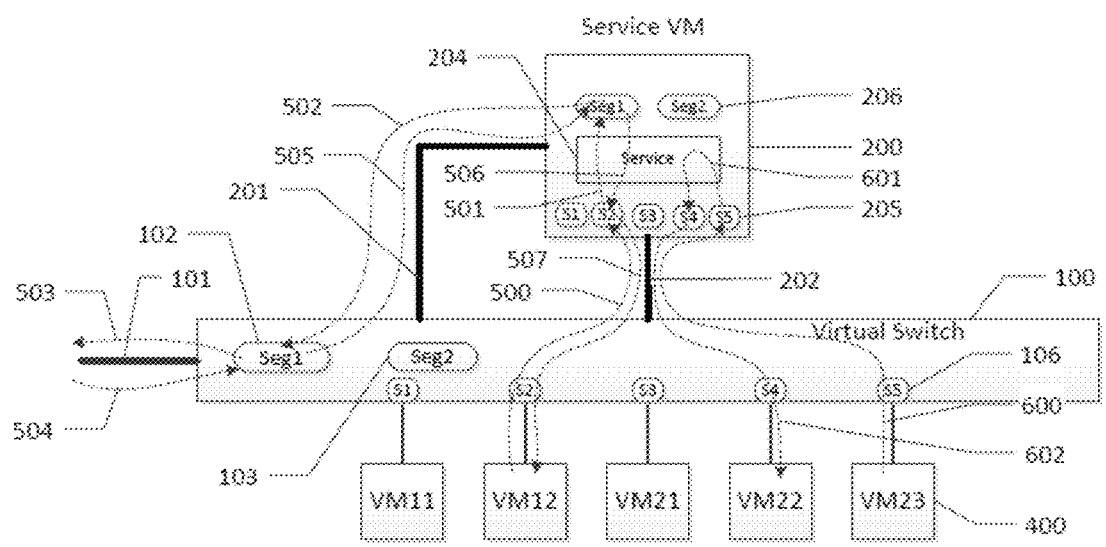
FIG. 3 illustrates another processing system in accordance with other embodiments.

FIG. 3 illustrates another processing system that implements a service insertion. In this embodiment, the processing system does not include the service virtual switch 300. As shown in the figure, the processing system includes a virtual switch 100, multiple VMs 400, and a service VM (service machine) 200. The virtual switch 100 is configured on a physical server. The virtual switch 100 connects to the rest of data center network through an uplink 101. The virtual switch 100 originally has two network segments, Seg1 102 and Seg2 103, for communication with the data center network. As shown in FIG. 1, five user VMs VM11, VM12, VM21, VM22, VM23 connect to Seg1 102 and Seg2 103. After service insertion, as shown in the configuration in FIG. 3, five new network segments, S1, S2, S3, S4 and S5 are created on the virtual switch 100. They are designed to isolate user VMs 400 for internal network. As shown in the figure, the VM11, VM12, VM21, VM22 and VM23 connect to network segments S1-S5, respectively. By means of non-limiting examples, the virtual switch 100 may comprise a Linux bridge, an open vSwitch, a VMware vSphere standard switch, or a VMware vSphere distributed switch.

The service machine 200 is connected to the virtual switch 100 through a trunk 201 and a trunk 202. In the illustrated embodiments, the service machine 200 has a first communication interface for communicating with the virtual switch 100 through the trunk 202, and a second communication interface for communicating with the virtual switch 100 through the trunk 201. In some cases, the first and second communication interfaces may be respective trunk ports. The trunk 201 is configured to communicate with data center network through the virtual switch 100, and the trunk 202 is configured to communicate with the VMs 400 (i.e., VM11, VM12, VM21, VM22 and VM23 in the example) through the virtual switch 100.

As discussed with reference to FIG. 1, the user VM11 and user VM12 were originally connected to Seg1 102 on the virtual switch 100. Accordingly, in the deployment shown in FIG. 3, two VM based network segments, S1 and S2, are configured on the virtual switch 100 for these user VMs. VM11 and VM12 connect to these segments respectively. Also, as discussed with reference to FIG. 1, user VM21, user VM22 and user VM23 were connected to Seg2 103 on the virtual switch 100. Accordingly, in the deployment shown in FIG. 3, three VM based network segments, S3, S4 and S5 106, are configured on the virtual switch 100 for these VMs. VM21, VM22 and VM23 connect to these segments respectively.

At the service machine 200, two network segments, Seg1 and Seg2 206, are configured on the communication interface on which the trunk 201 connects. This ensures that Seg1 and Seg2 206 have the same network connectivity as the Seg1 102 and Seg2 103 on the virtual switch 100. Also, at the service machine 200, five network segments, S1, S2, S3, S4, and S5 205, are configured on the communication interface on which the trunk 202 connects. The network segments 205 at the service machine 200 correspond (e.g., match) the configuration with the network segments on the service virtual switch 100. This ensures that the user VMs 400 can reach the network segments 205 at the service machine 200. In some cases, the service machine 200 may be configured to map packets into different network segments based on packet destinations. In other cases, the mapping may be based on other parameter(s).

Since the user VM11 and the user VM12 were previously connected to Seg1 102 on the virtual switch 100 (as described with reference to FIG. 1), segments S1 and S2 are related to Seg1 on the service machine 200. Similarly segments S3, S4 and S5 are related to Seg2 on the service machine 200. The service machine 200 is configured to provide this mapping relationship that maps the VM-based network segments with the original network segments. Based on this mapping, packet is labeled with the corresponding tag when it is sent to certain segment. For example, packets may be tagged by the virtual switch 100. In some cases, the service machine 200 may also be configured to tag packets and/or to modify tags of packets. By means of non-limiting examples, the VM-based network segments may be based on a VLAN, a bridge, a VMware port group.

As shown in FIG. 3, the service machine 200 includes a service module 204. The service module 204 is configured to provide one or more network service(s). By means of non-limiting examples, the service module 204 may be configured to provide one or more firewall function(s), one or more intrusion prevention function(s), one or more WAF function(s), one or more QoS function(s), one or more DPI function(s), etc., or any combination of the foregoing. Thus, the service module 204 may comprise a firewall, an IPS, a WAF, a QoS, a DPI, or any combination of the foregoing. Also, in some cases, the service module 204 may include a mapping module configured to provide the mapping between the VM-based network segments and the original network segments that are associated with the virtual switch 100. In other cases, the service machine 200 may include another module for providing such segment mapping function. In other embodiments, the service machine 200 may include multiple service modules 204.

Two packet flow examples will now be described to illustrate how the processing system of FIG. 3 can provide inserted services. In the first example, the user VM12 sends packet to and receive packet from the Internet. When the user VM12 sends a packet to the Internet, it first sends the packet to the default gateway of its network, then the default gateway sends the packet to other nodes on Internet. In this example, the default gateway can be reached through the trunk connection 101. It is assumed that all the ports on virtual switch and the user VM12 have learned the MAC address of the interface on the default gateway. The packet leaves the user VM12 and enters segment S2 on the virtual switch 100. Based on MAC lookup, the virtual switch 100 forwards the packet through the trunk connection 202, and the packet reaches segment S2 on the service machine 200. The packet path is represented by arrow 500. Inside the service machine 200, one or more desired service(s) is applied for the packet, and the packet is then forwarded to segment Seg1, as represented by arrow 501. The service machine 200 then transmits the packet through the second communication interface to the trunk 201, and the packet reaches segment Seg1 102. This path is represented by arrow 502. The packet is then sent to the default gateway through the trunk 101, as represented by arrow 503.

A node on the Internet sends a return packet, and the return packet first reaches the default gateway. Then the return packet reaches segment Seg1 102 through the trunk 101, as represented by arrow 504. The return packet is then forwarded to Seg1 at the service machine 200, as represented by arrow 505. The packet goes through the service module 204, where one or more services are provided to process the packet, as represented by arrow 506. The packet is then transmitted on segment S2 and reaches VM12, as represented by arrow 507. Accordingly, through the virtual switch 100 and the service machine 200, the desired service(s) is provided to the packet path between the user VM12 and the Internet.

In another example, one or more desired services are provided between two user VMs on the same network segment, such as between the user VM22 and the user VM23. In the original configuration shown in FIG. 1, the user VM22 and the user VM23 are connected to segment Seg2 103 on the virtual switch 100. Thus, service cannot be inserted between VM22 and VM23 in this kind of deployment. However, with the configuration shown in FIG. 3, one or more services can be inserted in the communication path between the user VM22 and the user VM23. This is because in the configuration shown in FIG. 3, the user VM22 and the user VM23 are connected to separate segments on the virtual switch 100. In particular, since the user VM22 and the user VM23 are connected to two different network segments S4 and S5 respectively, they cannot directly communicate at the service switch 100. Instead, the VM23 sends packet to segment S5, and the packet is then forwarded to the segment S5 at the service machine 200, as represented by the packet path 600. The packet is then passed to the service module 204, where one or more service(s) for processing the packet is provided. After the packet has been processed, and based on the service rule configuration in the service module 204, the service module 204 forwards the packet to Seg4, as represented by arrow 601. Then the packet is sent to user VM22 in segment S4, as represented by arrow 602. Accordingly, through the configuration of the virtual switch 100 and the VM-based network segments, the communication between two user VMs can go through the service machine 200 that provides one or more desired service(s).

In some embodiments, isolation for two or more user VMs in the system of FIG. 3 may be created using private VLAN, as similarly discussed with reference to FIG. 2B.

In some embodiments, the processing system of FIG. 3 may be achieved through a method that includes (1) providing the service machine 200 having the service module 204, a first communication interface, and a second communication interface, wherein the first communication interface is configured for communication with the virtual switch 100, and wherein the second communication interface is configured for communication with the virtual switch 100, the virtual switch 100 configured for communicating with the user VMs 400, and (2) logically coupling the service machine 200 to the virtual switch 100 by: (a) associating the first communication interface with a plurality of VM-based network segments at the virtual switch 100, the plurality of VM-based network segments corresponding with the plurality of user VMs 400, respectively, and (b) associating the second communication interface with original network segments at the virtual switch 100.

The act of logically coupling may include communicatively coupling the service machine 200 with the service switch 300 through a first trunk, and communicatively coupling the service machine 200 with the service switch 300 through a second trunk.

The method may also include providing VM-based network segments at the virtual switch 100, which correspond with the plurality of user VMs 400. The method may also include providing a mapping (e.g., a mapping module) at the service machine 200 for mapping original network segments associated with the virtual switch 100, with the VM-based network segments. The VM-based network segments may be based on VLAN(s), bridge(s), VMware port group(s), etc. The method may also include configuring the service machine 200 to map packets into different network segments based on packet destinations. In some embodiments, a packet mapping configurator may be provided to configure the service machine 200 so that it can map packets into different network segments based on the packet destinations.

Figure 4:
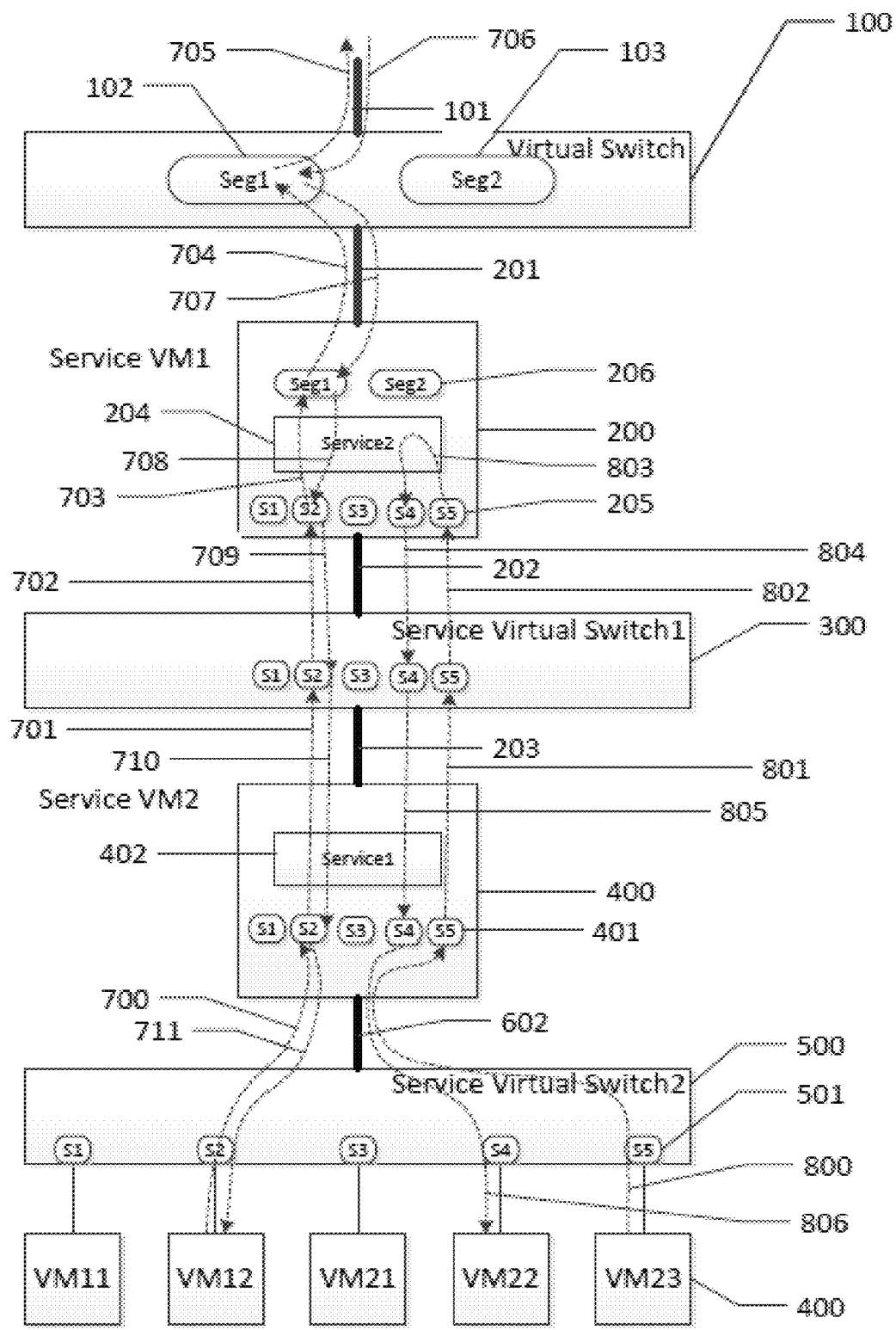
FIG. 4 illustrates another processing system in accordance with other embodiments.

FIG. 4 illustrates another processing system that implements a service insertion, particularly showing the processing system providing multiple services. For each type of service, one service VM (service machine) and one service virtual switch (service switch) are deployed in a cascade fashion. FIG. 4 shows two sets of service machine and service switch of for providing two service insertions. In other embodiments, the processing system may include more than two sets of service machine and service switch for providing more than two service insertions.

In particular, the processing system includes the original virtual switch 100 and the user VMs 400. By means of non-limiting examples, the virtual switch 100 may comprise a Linux bridge, an open vSwitch, a VMware vSphere standard switch, or a VMware vSphere distributed switch. The virtual switch 100 is configured on a physical server. The virtual switch 100 connects to the rest of data center network through an uplink 101. Two network segments, Seg1 102 and Seg2 103, are configured on the virtual switch 100.

The processing system also includes a first service VM (service machine) 200 with a service module 204, and a first service virtual switch (service switch) 300. The processing system also includes a second service VM (service machine) 400 with a service module 402, and a second service virtual switch (service switch) 500. These components 200, 300, 400, 500 are communicatively coupled to one another serially (e.g., in a logical sense) through trunks 201, 202, 203, 602. As shown in the figure, the service machine 200 connects to the virtual switch 100 through trunk 201. The service switch 300 connects to the service machine 200 through another trunk 202. The service machine 400 connects to the service switch 300 through trunk 203. The service switch 500 connects to the service machine 400 through trunk 602. The user VMs 400 (e.g., VM11, VM12, VM21, VM22 and VM23) connect to service switch 500.

On the service machine 200, two network segments, Seg1 and Seg2 206, are configured on the interface on which the trunk 201 connects. This ensures that Seg1 and Seg2 206 have the same network connectivity as the Seg1 102 and Seg2 103 on the virtual switch 100. On the service machine 200, five network segments, S1, S2, S3, S4, and S5 205 are configured on the interface on which the trunk 202 connects. These network segments correspond (e.g., matches) the configuration of the network segments at the service switch 300. In some cases, the service machine 200 may be configured to map packets into different network segments based on packet destinations. In other cases, the mapping may be based on other parameter(s).

On the service switch 300, five network segments, S1, S2, S3, S4 and S5 are configured to correspond with the segments S1, S2, S3, S4 and S5 in the service machine 200 and the service machine 400, so that they are the same segments.

On the service machine 400, five network segments, S1, S2, S3, S4, and S5 401 are configured on the interfaces on which trunk 203 and 602 connect. These segments correspond (e.g., match) with the configuration of the network segments on the service switch 500. In some cases, the service machine 400 may be configured to map packets into different network segments based on packet destinations. In other cases, the mapping may be based on other parameter(s).

In the original deployment shown in FIG. 1, the user VM11 and the user VM12 were connected to Seg1 102 on the virtual switch 100. Accordingly, in the configuration shown in FIG. 4, two VM-based network segments, S1 and S2 501 are configured on the service switch 500, to which the user VM11 and the user VM12 connect, respectively. Also, in the original deployment shown in FIG. 1, VM21, VM22 and VM23 were connected to Seg2 103 on the virtual switch 100. Accordingly, in the configuration shown in FIG. 4, three VM-based network segments, S3, S4 and S5 501, are configured on the service switch 500, to which VM21, VM22 and VM23 connect, respectively. This ensures that the user VMs 400 can reach the network segments 401 on the service machine 400, and can reach the network segments 207 on the service machine 200.

Since the user VM11 and the user VM12 used to connect to Seg1 102 on the virtual switch 100, segments S1 and S2 are related to Seg1 on the service machine 200. Similarly segments S3, S4 and S5 are related to Seg2 on the service machine 200. The service machine 200, the service machine 400, the service switch 300, the service switch 500, or any combination of the foregoing, is configured to provide this mapping relationship that maps the VM-based network segments with the original network segments. Based on this mapping, packet is labeled with the corresponding tag when it is sent to certain segment. For example, packets may be tagged by the service switch 500, the service switch 300, the virtual switch 100, or all. In some cases, the service machine 200 and the service machine 400 may also be configured to tag packets and/or to modify tags of packets. By means of non-limiting examples, the VM-based network segments may be based on a VLAN, a bridge, a VMware port group.

As shown in FIG. 4, the service machine 200 includes a service module 204. Also, the service machine 400 includes a service module 402. Each of the service modules 204, 402 is configured to provide one or more network service(s). By means of non-limiting examples, the service module 204/402 may be configured to provide one or more firewall function(s), one or more intrusion prevention function(s), one or more WAF function(s), one or more QoS function(s), one or more DPI function(s), etc., or any combination of the foregoing. Thus, the service module 204/402 may comprise a firewall, an IPS, a WAF, a QoS, a DPI, or any combination of the foregoing. Also, in some cases, the service module 204/402 may include a mapping module configured to provide the mapping between the VM-based network segments and the original network segments that are associated with the virtual switch 100. In other cases, the service machine 200 and/or the service machine 400 may include another module for providing such segment mapping function. In other embodiments, the service machine 200 may include multiple service modules 204. Similarly, in other embodiments, the service machine 400 may include multiple service modules 402.

Two packet flow examples will now be described to illustrate how the processing system of FIG. 4 can provide inserted services. In the first example, the user VM12 sends packet to the Internet, and receives a return packet from Internet. When the user VM12 sends a packet to Internet, it first sends the packet to the default gateway of its network, then the default gateway sends the packet to other nodes on Internet. In this example, the default gateway can be reached through trunk connection 101. It is assumed that all the ports on the switches and the user VM12 have learned the MAC address of the interface on the default gateway. The packet leaves VM12 and enters segment S2 on the service switch 500. Based on MAC lookup, the service switch 500 forwards the packet through trunk connection 602, and the packet reaches segment S2 on the service machine 400. This packet path is represented by arrow 700. Inside the service machine 400, the desired service(s) is applied on the packet, and the packet is then forwarded to segment S2 in the service switch 300, as represented by arrow 701. The service switch 300 then sends the packet to the segment S2 at the service machine 200 through trunk port 202, as represented by arrow 702. At the service machine 200, the service module 204 provides one or more services for the packet. After the service module 204 has provided the service(s) for the packet, the service machine 200 then transmits the packet through trunk 201, and the packet reaches segment Seg1 102, as represented by arrow 704. The packet is then sent to the default gateway through trunk 101, as represented by arrow 705.

A node on the Internet sends a return packet to the processing system. The return packet from the Internet first reaches the default gateway. Then it reaches segment Seg1 102 through trunk connection 101, as represented by arrow 706. The return packet is then forwarded to Seg1 on the service machine 200, as represented by arrow 707. The return packet goes through the service module 204 wherein one or more service(s) is provided to process the packet, as represented by arrow 708. Then the service machine 200 transmits the return packet to the service switch 300 through the segment S2, as represented by arrow 709. Then the service switch 300 sends the return packet to the service machine 400 through the segment S2, as represented by arrow 710. The return packet is then transmitted on segment S2 in the service switch 500, and reaches the user VM12, as represented by arrow 711. Accordingly, through the service switches 300, 500 and service machines 200, 400, the desired service(s) is inserted to the packet path between the user VM12 and the Internet.

The processing system can also insert multiple services in the communication path between two user VMs on the same network segment, such as in the communication path between the user VM22 and the user VM23. In the original deployment shown in FIG. 1, the user VM22 and the user VM23 connect to segment Seg2 103 on the virtual switch 100. Service cannot be inserted between the user VM22 and the user VM23 in this configuration.

In the deployment shown in FIG. 4, the user VM22 and the user VM23 connect to separate respective segments on the service switch 500. Since the user VM23 and the user VM22 connect to two different network segments, S4 and S5, they cannot directly communicate on the service switch 500. Instead, the user VM23 sends packet to segment S5 at the service switch 500, and the packet is then forwarded to segment S5 on the service machine 400, as represented by arrow 800. Based on the service rule configuration in the service module 402, the service module 402 forwards the packet to segment S5 on the service switch 300, as represented by arrow 801. Then the service switch 300 sends it to segment S5 on the service machine 200, which path is represented by arrow 802. Then the packet is sent from segment S5 to segment S4 through the service module 204, as represented by arrow 803. Then packet is sent to segment S4 on service switch 300, as represented by arrow 804. Then the packet is sent from the service switch 300 to segment S4 at the service machine 400, as represented by arrow 805. The packet is then sent from the service machine 400 to the segment S4 at the service switch 500, and is output to the user VM22, as represented by arrow 806.

Through the configuration of the service switches 300, 500 and VM-based network segments, the communication between two user VMs can go through service machines that provide the desired services.

FIG. 4 shows two sets of service machine and service switch of for providing two service insertions. In other embodiments, the processing system may include more than two sets of service machine and service switch for providing more than two service insertions. For example, in other embodiments, there may be more than two service machines and more than two service switches that are logically coupled between the user VMs 400 and the virtual switch 100.

In some embodiments, isolation for two or more user VMs in the system of FIG. 4 may be created using private VLAN, as similarly discussed with reference to FIG. 2B.

In some embodiments, the processing system of FIG. 4 may be achieved through a method that includes (1) providing a first service machine (e.g., the service machine 200/400) having a first service module (e.g., service module 204/402), (2) providing a first service switch (the service switch 300/500), (3) providing a second service machine (e.g., the service machine 200/400) having a second service module (e.g., service module 204/402), and (4) providing a second service switch (e.g., the service switch 300/500), (5) logically coupling the first service machine and the first service switch between existing user VMs 400 and an existing virtual switch 100, and (6) logically coupling the second service machine and the second service switch between existing user VMs 400 and the existing virtual switch 100. In the illustrated embodiments, the first service machine, the first service switch, the second service machine, and the second service switch may be coupled serially in a logical sense. The act of logically coupling may include moving user VMs 400 from the original virtual switch 100 to one of the first and second service switches.

The method may also include creating VM-based network segments on the first service switch, the second service switch, the first service machine, the second service machine, or any combination of the foregoing. The created VM-based network segments correspond with the plurality of user VMs 400. The method may also include providing a mapping (e.g., a mapping module) at the first service machine, the second service machine, or both, for mapping original network segments associated with the virtual switch 100, with the VM-based network segments. The VM-based network segments may be based on VLAN(s), bridge(s), VMware port group(s), etc. The method may also include configuring the first and second service machines to map packets into different network segments based on packet destinations. In some embodiments, a packet mapping configurator may be provided to configure the first and second service machines so that it can map packets into different network segments based on the packet destinations.

Figure 5:
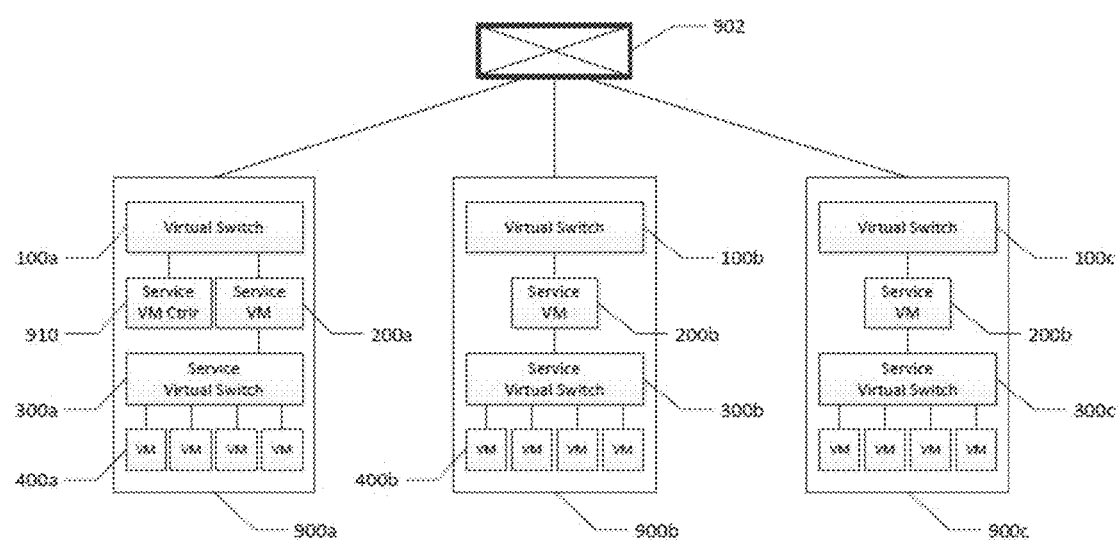
FIG. 5 illustrates another processing system in accordance with other embodiments.

In some embodiments, each of the processing systems of FIG. 2A, FIG. 2B, FIG. 3, and FIG. 4 may be deployed on one physical server. In other embodiments, any of the processing systems described previously may be replicated on multiple servers within a data center as shown in FIG. 5. In FIG. 5, three physical servers 900a, 900b, and 900c, are connected to a physical switch 902. On the physical server 900a, after service insertion, multiple user VMs 400a connect to the service virtual switch (service switch) 300a. The service VM (service machine) 200a connects to the service switch 300a and the original virtual switch 100a. The configuration of the processing system in the server 900a is replicated to obtain additional processing systems in the servers 900b, 900c. In particular, on the physical server 900b, after service insertion, multiple user VMs 400b connect to the service virtual switch (service switch) 300b. The service VM (service machine) 200b connects to the service switch 300b and the original virtual switch 100b. Similarly, on the physical server 900c, after service insertion, multiple user VMs 400c connect to the service virtual switch (service switch) 300c. The service VM (service machine) 200c connects to the service switch 300c and the original virtual switch 100c. As shown in the figure, there may be an optional service VM controller 910 that runs on the physical server 900a. This controller 910 can provide single service management interface, service work load partition, service VM monitoring functionalities, etc.

As shown in the example above, the processing system for service insertion in the server 900a can be replicated to other physical servers in one data center, like server 900b and server 900c. Thus the service can be provided for all user VMs in the data center. In the example shown in FIG. 5, the processing system in each of the physical servers 900a, 900b, 900c has the configuration like that shown in FIG. 2A. In other examples, any of the physical servers 900 may include the processing system of FIG. 3 or FIG. 4. For example, in other embodiments, the processing system of FIG. 3 and/or FIG. 4 may be replicated and deployed to multiple physical servers in a data center.

Specialized Processing Architecture

Figure 6:
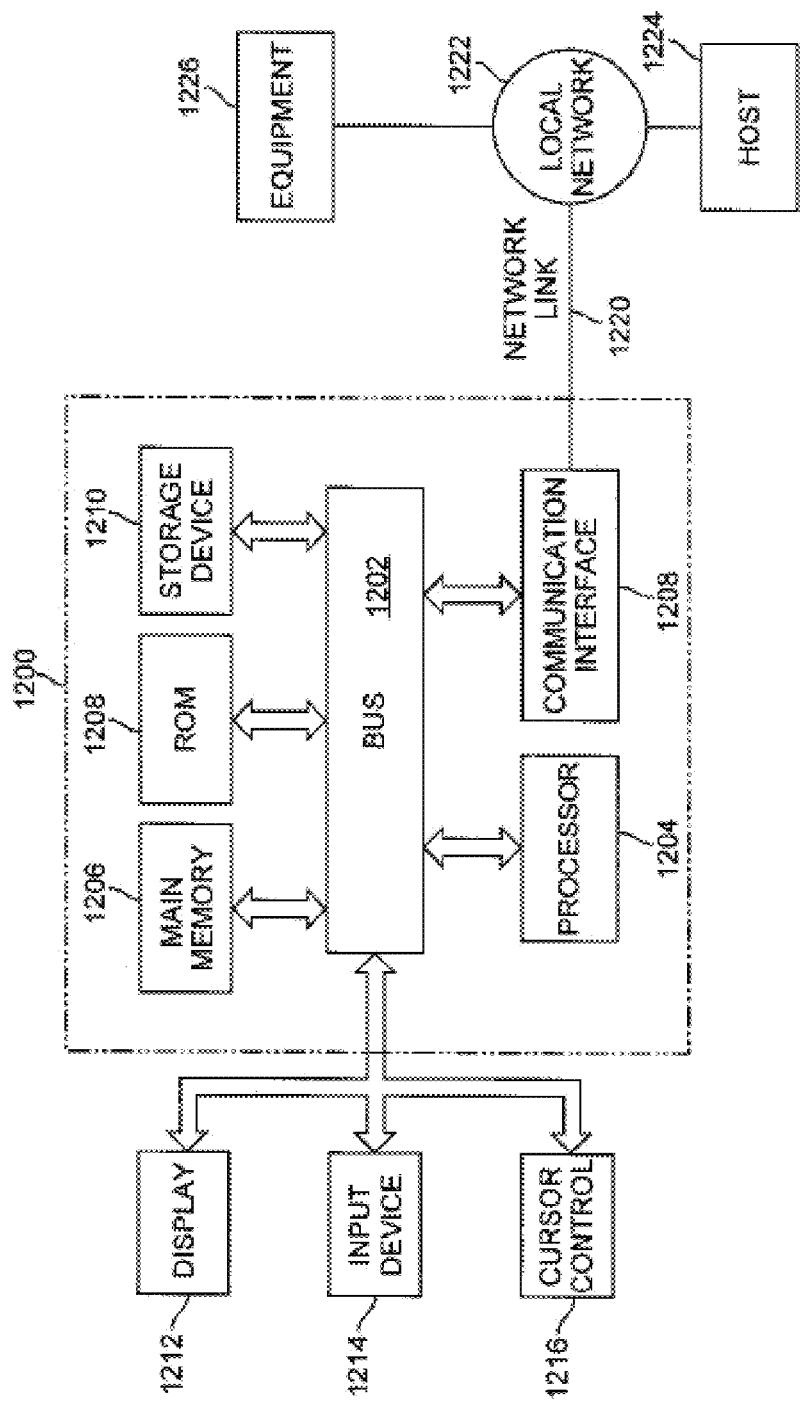
FIG. 6 illustrates an example of a specialized processing system with which embodiments described herein may be implemented.

In some embodiments, one or more virtual machine(s), the service machine 200, the service switch 300, or any combination of the foregoing may be implemented using a specialized processing system. FIG. 6 is a block diagram that illustrates an embodiment of a specialized processing system 1200 upon which embodiments described herein may be implemented. For example, in some embodiments, the processing system 1200 may include a service switch module configured to implement the service switch 300, a service machine module configured to implement the service machine 200, or a combination of both. Also, in some cases, the processing system 1200 may include one or more modules for implementing one or more user VMs 400, and/or a virtual switch module for implementing the virtual switch 100. In other embodiments, there may be multiple processing systems 1200 for implementing different respective components, e.g. the service machine 200, the service switch 300, the virtual switch 100, one or more user VMs 400, etc.

As shown in FIG. 6, the processing system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component.

The processing system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The processing system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The processing system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The processing system 1200 may be used for performing various functions in accordance with the embodiments described herein. According to one embodiment, such use is provided by the processing system 1200 in response to processor 1204 executing one or more sequences of one or more instructions contained in the main memory 1206. Such instructions may be read into the main memory 1206 from another processor-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "processor-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the processor system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The processor system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the processor system 1200, are exemplary forms of carrier waves transporting the information. The processor system 1200 can send messages and receive data, including program code, through the network(s), the network link 1220, and the communication interface 1218.

In some embodiments, the processor system 1200 may be a part of a physical server or computer that is specifically configured to implement one or more features described herein. For example, the service VM(s) and service switch (es) described herein may be virtual components implemented on such physical server. However, it should be noted that the configuration of the server or computer is not necessarily limited to the example described. In other embodiments, the service VM(s) and the service switch(es) described herein may be created and configured on any physical server as long as the server supports virtualization.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A processing system, comprising:
a first service machine having a first service module; and
a first service switch;
wherein the first service machine and the first service switch are logically coupled between (1) a plurality of virtual machines and (2) a virtual switch to provide transmission of data between (1) the plurality of virtual machines and (2) the virtual switch via the first service machine and the first service switch;
wherein the first service machine comprises a first communication interface and a second communication interface, the second communication interface being in communication with the first service switch.

2. The processing system of claim 1, wherein the first communication interface is configured for communication with the virtual switch.

3. The processing system of claim 1, wherein the first service switch comprises a third communication interface configured for communication with the plurality of virtual machines.

4. The processing system of claim 1, wherein the first service switch provides VM-based network segments.

5. The processing system of claim 4, wherein the VM-based network segments correspond with the plurality of virtual machines, respectively.

6. The processing system of claim 4, wherein the virtual switch also provides original network segments, and wherein the first service machine comprises a mapping for mapping the original network segments and the VM-based network segments.

7. The processing system of claim 4, wherein at least one of the VM-based network segments is based on a VLAN, a bridge, a VMware port group.

8. The processing system of claim 1, wherein one of the virtual machines is in communication with another one of the virtual machines through the first service machine.

9. The processing system of claim 1, wherein the first service module comprises a firewall, an IPS, a WAF, a QoS, or a DPI.

10. The processing system of claim 1, wherein the first service module provides a virtualized function.

11. The processing system of claim 1, further comprising the virtual switch.

12. The processing system of claim 11, wherein the virtual switch comprises a Linux bridge, an open vSwitch, a VMware vSphere standard switch, or a VMware vSphere distributed switch.

13. The processing system of claim 1, wherein the first communication interface is configured for communication with the virtual switch through a first trunk, and the second communication interface is configured for communication with the first service switch through a second trunk.

14. The processing system of claim 1, further comprising:
   a second service machine having a second service module; and
   a second service switch;
   wherein the second service machine and the second service switch are logically coupled between the plurality of virtual machines and the virtual switch.

15. The processing system of claim 14, wherein the first service machine, the first service switch, the second service machine, and the second service switch are coupled serially in a logical sense.

16. The processing system of claim 1, wherein the first service machine provides a mapping that maps packets into different network segments based on packet destinations.

17. The processing system of claim 1, wherein the first service switch is configured to receive information from one or more of virtual machines and pass the information received from the one or more of the virtual machines to the first service machine.

18. A data center having the processing system of claim 1, an additional processing system, and a physical switch, wherein the processing system and the additional processing system are coupled to the physical switch, and wherein the additional processing system comprises:
   a second service machine having a second service module; and
   a second service switch;
   wherein the second service machine and the second service switch are logically coupled between an additional plurality of virtual machines and an additional virtual switch.

19. A method of implementing a processing system, comprising:
   providing a first service machine having a first service module;
   providing a first service switch; and
   logically coupling the first service machine and the first service switch between a plurality of virtual machines and a virtual switch to provide transmission of data between (1) the plurality of virtual machines and (2) the virtual switch via the first service machine and the first service switch;
   wherein the first service machine comprises a first communication interface and a second communication interface, the second communication interface configured for communication with the service switch.

20. The method of claim 19, wherein the first communication interface is configured for communication with the virtual switch.

21. The method of claim 19, wherein the first service switch comprises a third communication interface configured for communication with the plurality of virtual machines.

22. The method of claim 19, further comprising providing VM-based network segments at the first service switch.

23. The method of claim 22, wherein the VM-based network segments correspond with the plurality of virtual machines, respectively.

24. The method of claim 22, wherein the virtual switch provides original network segments, and wherein the method further comprises providing a mapping at the first service machine that maps the original network segments and the VM-based network segments.

25. The method of claim 22, wherein at least one of the VM-based network segments is based on a VLAN, a bridge, a VMware port group.

26. The method of claim 19, wherein the first service module comprises a firewall, an IPS, a WAF, a QoS, or a DPI.

27. The method of claim 19, wherein the first service module provides a virtualized function.

28. The method of claim 19, wherein the virtual switch comprises a Linux bridge, an open vSwitch, a VMware vSphere standard switch, or a VMware vSphere distributed switch.

29. The method of claim 19, wherein the act of logically coupling the first service machine and the first service switch between the plurality of virtual machines and the virtual switch comprises communicatively coupling the first service machine with the virtual switch through a first trunk, and communicatively coupling the first service machine with the first service switch through a second trunk.

30. The method of claim 19, further comprising:
   providing a second service machine having a second service module;
   providing a second service switch; and
   logically coupling the second service machine and the second service switch between the plurality of virtual machines and the virtual switch.

31. The method of claim 30, wherein the first service machine, the first service switch, the second service machine, and the second service switch are coupled serially in a logical sense.

32. The method of claim 19, further comprising configuring the service machine to map packets into different network segments based on packet destinations.

33. The method of claim 19, wherein the first service switch is configured to receive information from one or more of virtual machines and pass the information received from the one or more of the virtual machines to the first service machine.

34. A processing system, comprising:
   a first service machine having a first service module; and
   a first service switch;
   wherein the first service machine and the first service switch are logically coupled between (1) a plurality of virtual machines and (2) a virtual switch;
   wherein the first service machine comprises a first communication interface and a second communication interface, the second communication interface being in communication with the first service switch; and
   wherein the first service machine is configured to communicate with the first service switch via a communication path, and wherein the virtual machines are outside the communication path.

35. A method of implementing a processing system, comprising:
   providing a first service machine having a first service module;
   providing a first service switch; and
   logically coupling the first service machine and the first service switch between a plurality of virtual machines and a virtual switch;
   wherein the first service machine comprises a first communication interface and a second communication interface, the second communication interface configured for communication with the service switch; and wherein the first service machine is configured to communicate with the service switch via a communication path, and wherein the virtual machines are outside the communication path.

* * * * *